(12) United States Patent
Li et al.

(10) Patent No.: US 7,463,805 B2
(45) Date of Patent: Dec. 9, 2008

(54) HIGH NUMERICAL APERTURE OPTICAL FIBER

(75) Inventors: Ming-Jun Li, Horseheads, NY (US); Ji Wang, Painted Post, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 19 days.

(21) Appl. No.: 11/255,401

(22) Filed: Oct. 20, 2005

(65) Prior Publication Data

US 2007/0104436 A1    May 10, 2007

(51) Int. Cl.
    *G02B 6/02*    (2006.01)
(52) U.S. Cl. .................... 385/123; 385/124; 385/125; 385/126; 385/127; 385/128
(58) Field of Classification Search .......... 385/123–128
    See application file for complete search history.

(56) References Cited

U.S. PATENT DOCUMENTS

| | | | |
|---|---|---|---|
| 5,807,652 | A | 9/1998 | Kovacs .................. 430/42 |
| 5,907,652 | A * | 5/1999 | DiGiovanni et al. ........ 385/125 |
| 5,949,941 | A | 9/1999 | DiGiovanni ............... 385/127 |
| 5,966,491 | A | 10/1999 | DiGiovanni ............... 385/127 |
| 6,115,526 | A | 9/2000 | Morse ................... 385/125 |
| 6,411,762 | B1 | 6/2002 | Anthon et al. ............ 385/123 |
| 6,477,307 | B1 | 11/2002 | Tankala et al. ........... 385/127 |
| 6,480,659 | B1 * | 11/2002 | Patlakh et al. ........... 385/125 |
| 6,483,973 | B1 | 11/2002 | Mazzarese et al. ......... 385/123 |
| 6,724,528 | B2 * | 4/2004 | Koplow et al. ........... 359/341.1 |
| 7,006,751 | B2 * | 2/2006 | Provost et al. ........... 385/141 |

* cited by examiner

*Primary Examiner*—Jennifer Doan
(74) *Attorney, Agent, or Firm*—Svetlana Z. Short

(57) ABSTRACT

An optical fiber, comprising: a core with a first refractive index ($n_1$); a silica based outer cladding surrounding the core, the outer cladding having a refractive index (n), such that the core is substantially surrounded by a gap situated between the core and the outer cladding, the gap containing at least one support structure adjacent to the outer cladding and situated between the outer cladding and the core, wherein the support structure is either hollow or gas filed and is not connected to any other support structure situated within the gap.

20 Claims, 7 Drawing Sheets

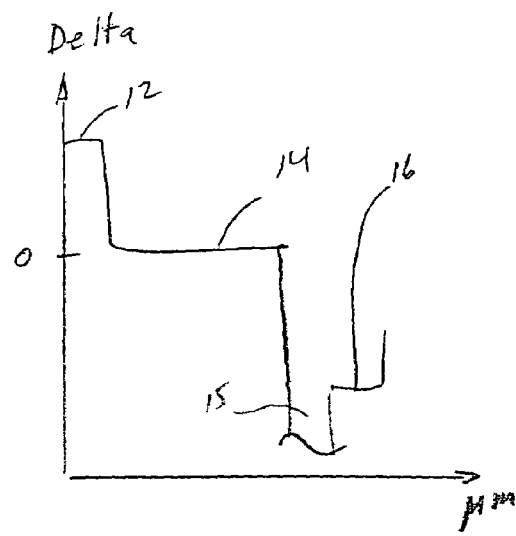
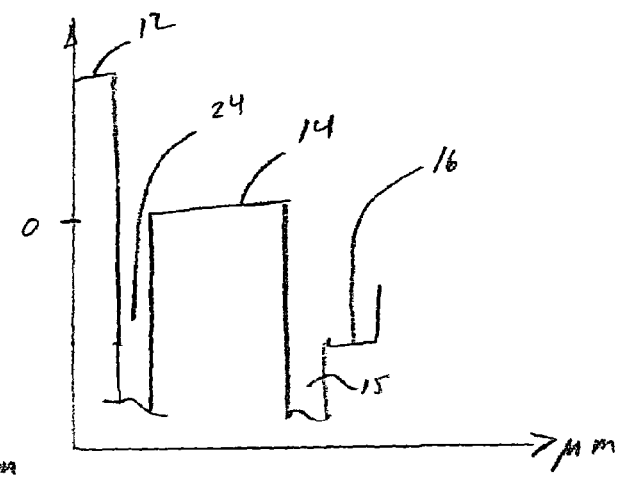
Fig.10A　　　　　　　　Fig.10B
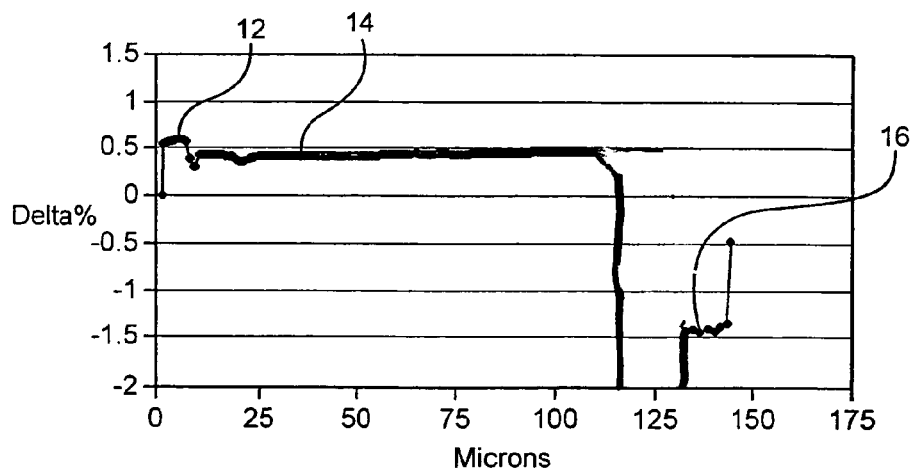
Fig.11

HIGH NUMERICAL APERTURE OPTICAL FIBER

BACKGROUND OF THE INVENTION

1. Field of the Invention

The present invention relates generally to optical waveguide fibers, and more particularly to a rare earth doped double clad fibers suitable for use in high power amplifiers and lasers.

2. Technical Background

Optical fiber has become a favorite medium for telecommunications due to its high capacity and immunity to electrical noise. Single clad rare earth doped optical fiber has been widely used in the field of optical amplifiers and fiber lasers. This type of fiber has low capability of handling high power multimode optical sources due to the difficulty of efficiently coupling multimode light from a high power optical (light) source (also referred to herein as optical pump or pump) into the rare-earth doped fiber core.

To solve this problem and to increase the output power of fiber lasers, those of skill in the art utilize optical fiber with a double clad structure (referred herein as double clad optical fiber). Double clad rare-earth doped optical fiber is a fiber that has a core, an inner cladding layer surrounding the core and an outer cladding layer surrounding the inner cladding layer.

Double clad optical fiber has been used in applications requiring utilization of optical sources providing between 10 to 1000 Watts of optical power, because double clad optical fiber is more efficient in retaining/utilizing optical power provided by the pump than single clad optical fiber. This higher efficiency is due to fiber's utilization of clad-to-core coupling of optical pump power. More specifically, rare-earth doped double clad optical fibers accept light from the optical pump into the inner cladding and then transfer light to the rare-earth doped core through the coupling of pump light between the core and the inner cladding, along the length of the optical fiber. Thus, the optical fiber converts a significant part of the multi-mode light propagated through the inner cladding into a single-mode output at a longer wavelength, by coupling this pump light into the rare-earth doped core.

The inner cladding of the double clad optical fiber has a higher index of refraction than the outer cladding, thus the pump energy is confined inside the inner cladding and is re-directed into the core. The optical fiber is optically active due to the presence of rare-earth dopant in the core, which can be excited to higher electronic energy levels when the optical fiber is pumped by a strong optical pump. Cladding pumping can be utilized in fiber amplifiers, or employed to build high-power single mode fiber pump lasers.

In a double-clad laser, an outer cladding of the optical fiber confines the pump light provided by an optical pump in the optical fiber's multi-mode inner cladding. The much smaller cross-sectional area of the optical fiber's core is typically doped with at least one rare-earth element, for example, neodymium or ytterbium, to provide lasing capability in a single-mode output signal. Typically, a neodymium- or ytterbium-doped double-clad fiber is pumped with one or several high-power broad-area diode lasers (at 800 nm, 915 nm or 976 nm) to produce a single transverse mode output (at the neodymium four-level transition of 1060 nm or the ytterbium four level transition of 1030 nm-1120 nm, respectively). Thus, conventional double-clad arrangements facilitate pumping of the fiber using a multi-mode innert cladding for accepting and transferring pump energy to a core along the length of the device. Double-clad laser output can also be used to pump a cascaded Raman laser to convert the wavelength to around 1480 nm, which is suitable for pumping erbium.

How much pump light can be coupled into a double-clad fiber's inner cladding depends on the inner cladding size and its numerical aperture NA. Typically, a high numerical aperture NA (0.2 or more) of the inner cladding, which is related to the difference in refractive index between the inner and outer cladding, is desired. In the well-known design, the first clad layer (inner cladding) is made of glass and the second layer (outer cladding) is made of plastic (for example, fluorinated polymer) with relatively low refractive index in order to increase the numerical aperture NA of the inner cladding to a relatively high value. Such plastic may not have the desired thermal stability for many applications, may delaminate from the first cladding, and may be susceptible to moisture damage. In addition, this type of double clad optical fiber may be suitable only for sustained use with relatively low power (lower than 20 Watts) optical sources. When high power sources (more than 100 Watts) are utilized, this type of optical fiber heats and the polymer material of the outer cladding layer carbonizes or burns, resulting in device failure, especially when the fiber is bent. At medium powers (20 Watts to below 100 Watts), the polymer outer cladding ages relatively quickly, losing its mechanical and optical characteristics and becoming brittle, thus shortening the device life.

All-glass, Yb doped optical fibers are also known, but are generally not suitable for high power applications because they have a relatively low outer cladding diameter and NA, and therefore, low coupling efficiency due to light leakage outside of the optical fiber. That is, a relatively large portion of the light does not enter the optical fiber and is lost. Although this may not be an issue in applications when only a small amount of optical power needs to be coupled into the fiber, such fiber is not efficient for high power applications when the light source power is 100 Watts or more. Furthermore, the numerical aperture values of the inner cladding are limited by the index of refraction of the outer cladding glass and can not be increased beyond NA of 0.4 or 0.45 with the current manufacturing technologies. However, it is desirable to have an optical fiber with the outer cladding NA of higher than 0.45 that can also handle high power light sources.

Fibers that utilize air field space(s) are also known, but fibes have low effective numerical apertures (low ENAs) in fiber layer surrounded by the air space(s). That is, because the index of refraction of air is much smaller than that of optical plastic or glass, the numerical aperture of the region directly adjacent and surrounding fiber core is close to 1, when the tunneling loss is not taken into consideration. However, because the support structure situated within the air gap(s) are made of either solid glass rods, or the glass webbing that shares common glass walls, the light leaks (i.e. it tunnels out) of the fiber layer surrounded by the air space(s) to the outer cladding, through the connecting support structure.

It has, therefore, been an area of ongoing development to obtain an optical fiber that will provide an all glass structure suitable for high optical power application, that has a high numerical aperture cladding (NA>0.45) and that has minimal leakage of pump light (minimal or no tunneling) out of pumping region.

SUMMARY OF THE INVENTION

Definitions:

The following definitions and terminology are commonly used in the art.

Refractive index profile—the refractive index profile is the relationship between the refractive index (Δ%) and the optical fiber radius (as measured from the centerline of the optical fiber) over a selected portion of the fiber.

Birefringence—birefringence is the difference between the effective refractive indices of the two polarization modes.

Radii—the radii of the segments of the fiber are generally defined in terms of points where the index of refraction of the material used takes on a different composition. For example, the core has an inner radius of zero because the first point of the segment is on the centerline. The outer radius of the core is the radius drawn from the waveguide centerline to the last point of the refractive index of the core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, a down-doped annular segment surrounding the core would have an outer radii located at the interface between the annular segment and the cladding.

Relative refractive index percent Δ%—the term Δ% represents a relative measure of refractive index defined by the equation:

$$\Delta\% = 100 \times (n_i^2 - n_c^2)/2n_i^2$$

where Δ% is the maximum refractive index of the index profile segment denoted as i, and $n_c$, the reference refractive index, is taken to be the refractive index of the cladding layer. Every point in the segment has an associated relative index measured relative to the cladding.

In accordance with the present invention, a gain fiber is provided with a high NA inner cladding (pumping region) that advantageously has very little light loss, due to tunneling.

According to one aspect the present invention the an optical fiber comprises:

a core with a first refractive index ($n_1$);

a silica based outer cladding surrounding the core, the outer cladding having a refractive index (n), such that the core is substantially surrounded by a gap situated between the core and the outer cladding, said gap containing at least one support structure adjacent to the outer cladding and situated between the outer cladding and the core, wherein the support structure is either hollow or gas filed and is not connected to any other support structure situated within the gap.

According to one embodiment the optical fiber includes a core with a first refractive index ($n_1$);

a silica based inner cladding abutting and at least substantially surrounding the core, the inner cladding having a refractive index $n_2$, wherein $n_2 < n_1$;

a silica based outer cladding surrounding the inner cladding, the outer cladding having a fourth refractive index ($n_4$), the outer cladding and the inner cladding defining a space having a refractive index $n_3$ approximately equal to 1, so $n_3 < n_2$ and $n_3 < n_4$ and the space substantially encloses the inner cladding; and at least one support structure situated between the outer cladding and the inner cladding, wherein the support structure is either hollow or gas filed and is not connected to any other support structure. According to some of the embodiments of the present invention the space between the inner cladding and the outer cladding is a gas filed space. According to some embodiments of the present invention the optical fiber exhibits single polarization at the operating (i.e., output) wavelength band. According to some of the embodiments the core is a rare-earth doped core and the fiber especially suited for use in high power lasers and amplifiers.

One advantage of the optical fiber of the present invention is its capability to provide a large amount of pump power into the core, while minimizing loss pump power due to leakage of pump light out of pumping region.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

BRIEF DESCRIPTION OF THE DRAWINGS

FIG. 4B illustrates schematically relative refractive index profile optical fiber of FIG. 4A;

FIGS. 10A and 10B illustrate schematically relative a refractive index profiles of an exemplary optical fiber of the present invention, across two different cross-sections of the fiber; and FIG. 11 is a refractive index profile of the optical fiber of FIG. 1B.

DETAILED DESCRIPTION OF EMBODIMENTS

Figure 1A:
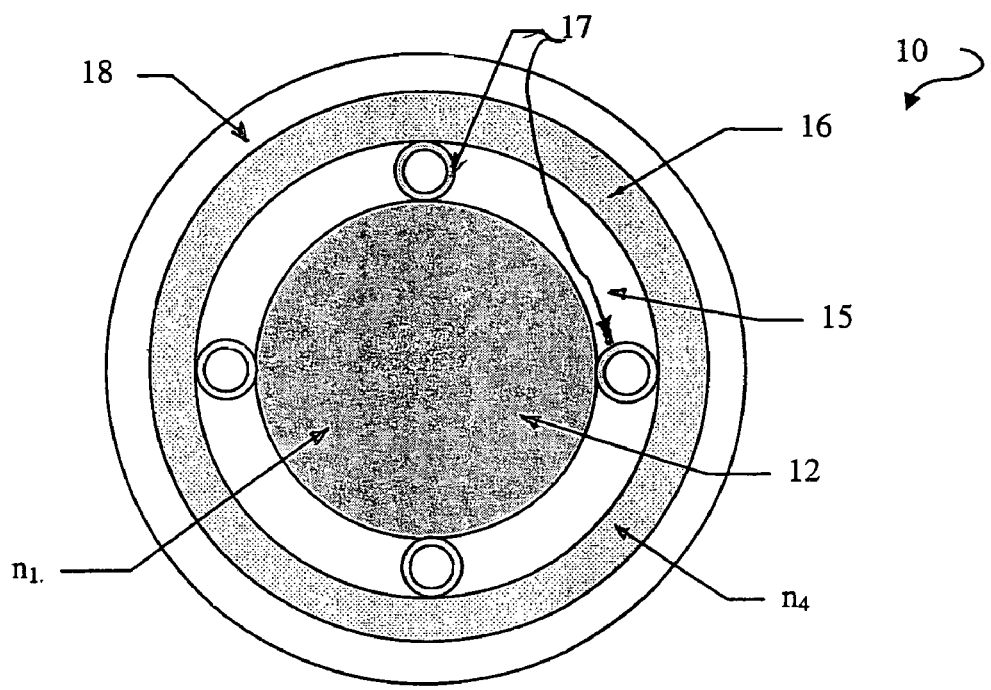
FIG. 1A is a schematic cross-sectional view of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. Two embodiments of double clad single polarization optical fiber 10 in accordance with the present invention are shown schematically in FIGS. 1A and 1B. The optical fiber 10 illustrated in FIG. 1A includes silica based, rare earth doped core 12 having a first index of refraction $n_1$ and silica based outer cladding 16 spaced apart from and surrounding the core 12. The core 12 is supported inside the outer cladding 16 by at least one hollow support structure 17. The support structure 17 is situated within the air gap 15, has thin walls, and is not attached to other support structures. Because the support structure 17 has thin walls, is hollow and is not attached to other support structures, the optical fiber 10 may advantageously have less than 0.1 dB/m loss due to light leakage trough the walls of the structure 17.

Figure 1B:
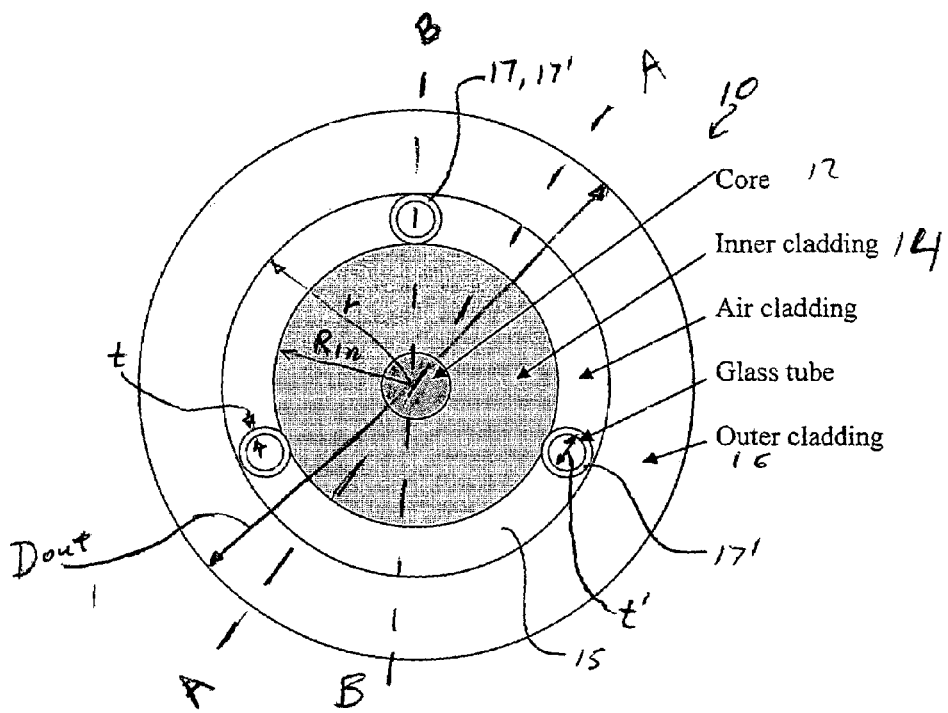
FIG. 1B is a schematic cross-sectional view of another embodiment of the present invention.

The optical fiber 10 illustrated in FIG. 1B is a double clad fiber and includes a silica based, rare earth doped core 12 having a first index of refraction $n_1$; a first silica based cladding 14 (inner cladding) surrounding the core 12 and having a second index of refraction $n_2$, such that $n_1 > n_2$; and a silica based outer cladding 16 spaced apart from and surrounding the first cladding 14 and having an index of refraction $n_4$. The core 12, inner cladding 14 and the outer cladding 16 are made of glass. A protective coating 18 surrounds the outer cladding 16. The outer coating 18 may be, for example, an organic coating which typically includes a softer primary coating and a harder secondary coating applied over the primary coating.

In general, a double-clad optical fiber according to the exemplary embodiments described herein can be advantageously utilized fiber laser or in optical amplifiers. The first (inner) multi-mode cladding inner cladding 14 of fiber 10 acts as a multi-mode pumping core. The inner cladding 14 is adjacent to the core 12 and a second (outer) cladding 16 surrounds the first or the inner cladding 14. The core 12 may be either single mode or multi-mode at the core lasing wavelength. The inner cladding 14 serves as a waveguide with a high numerical aperture NA for the input (pumping) light. That is, the inner cladding serves as a pump cavity. The larger the inner cladding diameter, the more pump light is coupled into the inner cladding from the optical source. The shape and the NA of the inner cladding 14 is designed to match that of the light source, for example, a laser diode.

As stated above, the outer cladding 16 and the inner cladding 14 are not directly adjacent to each other. More specifically, the outer radius $R_{IN}$ of the inner cladding 14 is smaller than the inner radius r of the outer cladding 16, such that there is a gap or space 15 formed between the two claddings 14, 16. This gap or space 15 may be gas-filled, for example by air or Ar, and substantially encloses the inner cladding 14. Alternatively it may contain a vacuum. Thus, the space 15 acts as another cladding with a very low index of refraction $n_3 \approx 1$, increasing inner cladding's numerical aperture NA to about 1, while having no or very minimal loss of light due to tunneling through the gap or space 15. Thus essentially all pump light can propagate through the inner cladding until it is coupled to the fiber core 12.

The inner cladding 14 is supported within the space 15 by at least one support structure 17. The support structure is 17 hollow and may be air or gas filled or may contain vacuum. An example of such support structure is a thin-walled hollow tube 17' as shown in FIG. 1B. Preferably, the support structure is 17 is made from down-doped silica, with the index of refraction $n_3'$ lower than that of the inner cladding 14. It is preferable that the wall thickness t of the support structure is 17 be smaller than spacing t' between the inner surface walls of the support structure. For example, if the support structure is 17 is a hollow tube (which may or may not be circular in cross-section), it is preferable that its wall thickness t be smaller than the diameter t' of the void's cross-section. It is preferable that the wall thickness t is 0.1 μm to 3 μm, more preferably 0.1 μm to 2 μm, and most preferably 0.1 μm to 1.5 μm. If the thickness t of the support structure or the glass tube is about the same as the pump wavelength or smaller, and the area of contact between the support structure 17 and the inner and outer cladding is very small, the support structure's (e.g., tube's) wall's equivalent index of refraction will approach that of air (i.e., 1). In addition, if the support structures, such as hollow tubes 17' do not touch one another, the amount of tunneling will be further minimized, to further reduce light loss due to tunneling through the support structure. Thus, there will be minimal, or essentially no leakage of light (for example, pump light) through the support structure 17 into the outer cladding 16. It is noted that in these example at least two of support tubes are separated by a distance larger than the width or the outer diameter of the support tubes. It is preferable, that the tubes ate separated by a distance at least twice that of their outer diameter. It is also noted that if circular support tubes are utilized in making a fiber perform, after the fiber is drawn the support tubes will typically be not circular in cross-section.

Figure 2:
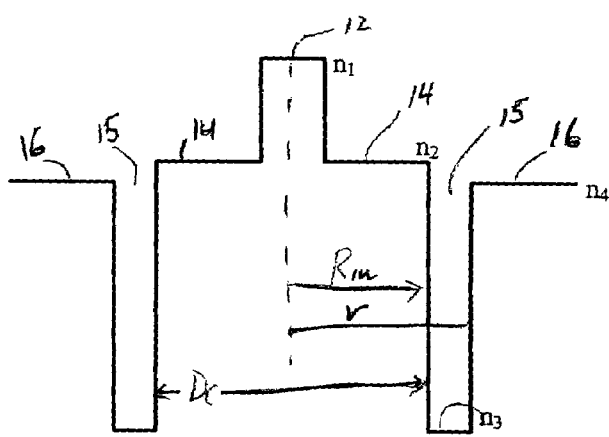
FIGS. 2 and 3 illustrate schematically relative refractive index profiles of the optical fiber of FIG. 1B.

The relative index profile of the optical fiber of FIG. 1B, along the cross-section A-A, is illustrated in FIG. 2. The relative refractive indices $n_1$, $n_2$, $n_3$, and $n_4$ correspond to the core 12, inner cladding 14, gap 15 and the outer cladding 16, respectively. The optical fiber 10 exhibits strong dips (see $n_3$) in the refractive index, which is associated with the air-filled void 15. If we assume that the light loss due to tunneling is negligible, because of the low index of refraction associated with the void or gap area 15, the numerical aperture NA of the fiber pumping region (i.e., inner cladding 14) is about 1. Thus, more light that is coupled to the inner cladding area from the light/laser source (that has a large numerical aperture) can be retained inside the inner cladding and then be coupled to the fiber core. However, in order for the pump light to stay within the inner cladding, it is important to minimize the amount of light loss from the inner cladding 14 due to light tunneling through the support structure 17. It is noted that the light leakage or loss due to tunneling reduces the Effective Numerical Aperture, ENA, of the inner cladding, so it does not equal to the calculated NA of the inner cladding (i.e., ENA does not equal 1).

Figure 3:
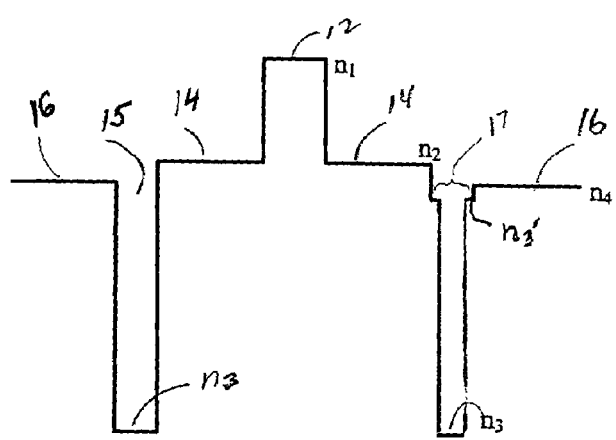

The index profile of the optical fiber of FIG. 1B, along the cross-section B-B, is illustrated in FIG. 3. The cross-section B-B includes the area associated with the support structure 17. The fiber profile shown in FIG. 3 is very similar to that of FIG. 2 and exhibits strong dips in refractive index. The two dips are associated with the air-filled void 15 and the support structure 17. Preferably, the glass material of support structure 17 has a lower refractive index $n_3'$ than that of the outer cladding 16, so as to prevent residual pump power from escaping the inner cladding 14 and entering into the outer cladding 16 via the walls of the support structure 17 (i.e., to reduce light loss or leakage due to tunneling). Thus it is preferable that the material of the support structure 17, for example glass material of the tube(s) 17' be made of down doped silica. For example down dopants such as F and/or B may be used to reduce the index of refraction $n_3'$.

Figure 4A:
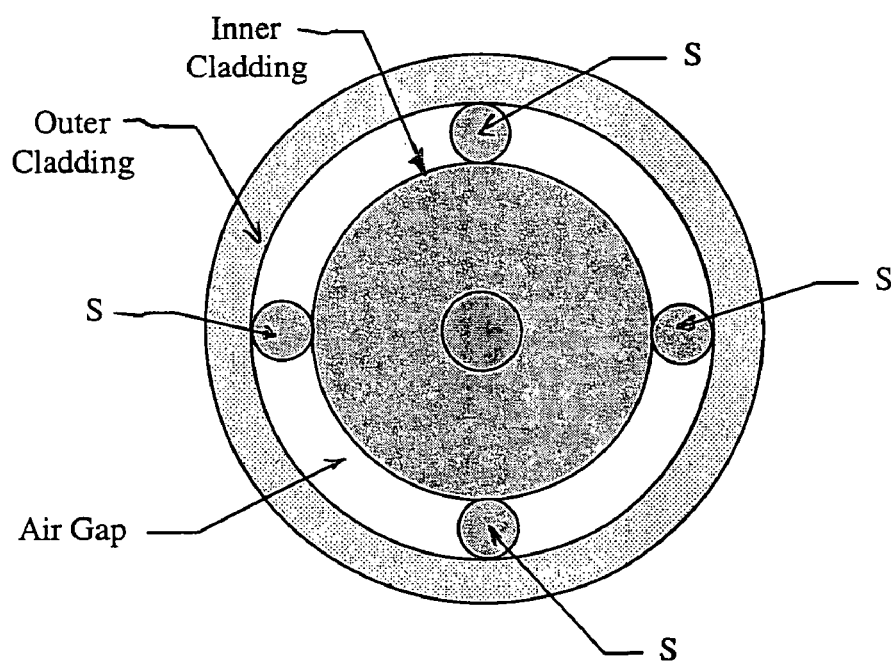
FIG. 4A illustrates schematically a cross-sectional view of the optical fiber that is not an embodiment of the present invention.

An optical fiber that utilizes solid silica rods S within the air gap region is shown schematically in FIG. 4A. Its refractive index profile, when taken across the areas associated with the support structures S, is shown schematically in FIG. 4B. Because the support structure is made of solid glass rods, and is relatively thick, a significant amount of pump light would leak out through the rods from the inner cladding. This leakage loss occurs because the solid glass rods form a glass bridge between the inner and the outer cladding of that fiber, without a significant refractive index dip.

Figure 5A:
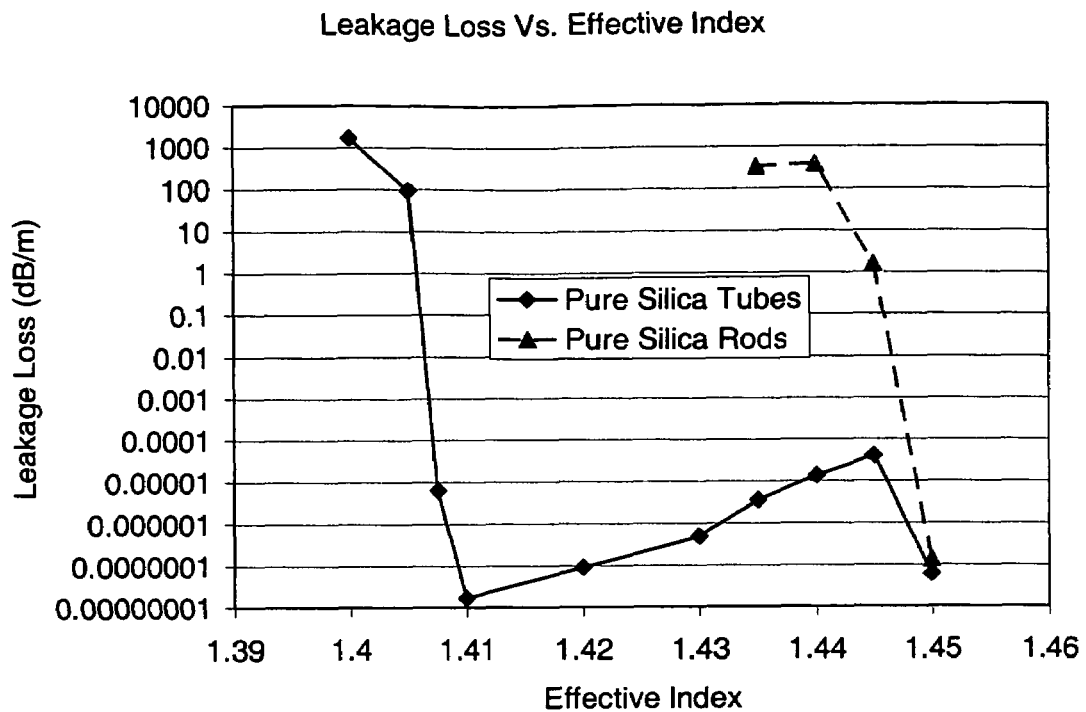
FIG. 5A is a graph of light leakage loss vs. the effective refractive index of the core/inner cladding area for the optical fiber that has solid support rods and the optical fiber according to an embodiment of the present invention that has thin silica tube support(s)

FIG. 5A illustrates the difference in the amount of pump light leakage (dB/m) between the fiber associated with FIGS. 4A and 4B (i.e., the fiber with the solid support structure between the inner and outer claddings), and that of one of the embodiments of the optical fiber 10 of the present invention, corresponding to FIG. 1B. The fiber of FIG. 4A has an inner cladding of 100 μm in diameter. The supporting structure of this fiber has four cylindrical glass rods placed evenly around the inner cladding. The diameter of the glass rods is 10 μm. The core is ignored for modeling simplicity, but this should not significantly effect results. Both the inner cladding and the glass rods are pure silica. The leakage loss of each mode is calculated to determine the effective NA. More specifically, FIG. 5A shows that the fiber of FIG. 4A has about 1 dB/m (or higher) loss when the effective index of refraction of the pump light (for different modes) propagating the inner cladding layer and the air gap is 1.445 or less. It is noted that each mode of pump light propagating through the inner cladding (and core) has a corresponding effective index of refraction. Thus, if we take a 1 m or more of this fiber and require, for example, that the optical fiber operates at light losses of less than 1 dB/m for each mode, than the effective cut-off index of refraction for the modes propagating through the inner cladding of this fiber is 1.445 and the modes associated with indices of refraction that are below 1.445 will be lost due to light leakage through the support rods. The refractive index of 1.445 would then be the equivalent index of refraction for the fiber area that includes the gap and the solid silica support rods. Since the light modes having an effective index of refraction below 1.445 will tunnel out, the equivalent index of refraction for this area is used to calculate the effective numerical aperture ENA of the inner cladding.

Thus, assuming that the inner cladding of this fiber is silica (refractive index of 1.45), and the fiber length is not minimal (i.e., that we can not ignore tunneling losses), the effective numerical aperture ENA of the inner cladding of the optical fiber corresponding to FIG. 4A is:

$$ENA = (n_{iner\ clad}^2 - n_{equivalent}^2)^{1/2} = (1.45^2 - 1.445^2)^{1/2} = 0.12.$$

This number illustrates that the effective numerical aperture of the inner cladding of this prior art fiber of FIG. 4A is much smaller than its calculated numerical aperture NA, and that a very large amount of light will be leaked out of the inner cladding through the solid support structure (silica rods) of the optical fiber associated with FIG. 4A. (Inner cladding NA is calculated without taking the tunneling losses into account using the following formula $NA = (n_{iner\ clad}^2 - n_{air}^2)^{1/2} = (1.45^2 - 1^2)^{1/2}$).

However, the optical fiber 10 according to some embodiments of the present invention (for example the fiber of FIGS. 1A-3) utilizes hollow, spaced apart support structures with thin walls and, because of that, has less than 0.0001 dB/m loss when the effective index of refraction of is about 1.44 (which is a 10,000× improvement over that of the prior art fiber described above), and less than 1 dB/m loss when the effective indices of refraction of modes are above about 1.405, allowing the fiber to function losslessly over a much larger effective index range. That is, the effective cut-off index of refraction for this fiber is 1.405, instead of 1.445, allowing the fiber 10 to couple and propagate more pump light (more modes) through the inner cladding 14. Therefore the equivalent index of refraction of the air gap region 15 of this fiber is about 1.405. Thus, when the tunneling loss of this fiber is taken into account, the effective numerical aperture ENA of the inner cladding of the optical fiber 10 of this embodiment of the present invention (again, assuming that the inner clad is a pure silica inner clad) is $ENA = (n_{iner\ clad}^2 - n_{equivalent}^2)^{1/2} = (1.45^2 - 1.405^2)^{1/2} = 0.34$. Therefore, almost three times more light will remain in the inner cladding and be available for coupling to the core, when compared to the prior art fiber associated with FIG. 4A. In this embodiment the inner cladding diameter is 100 μm, the tube outer diameter is 10 μm and the tube wall thickness is 1 μm.

Figure 5B:
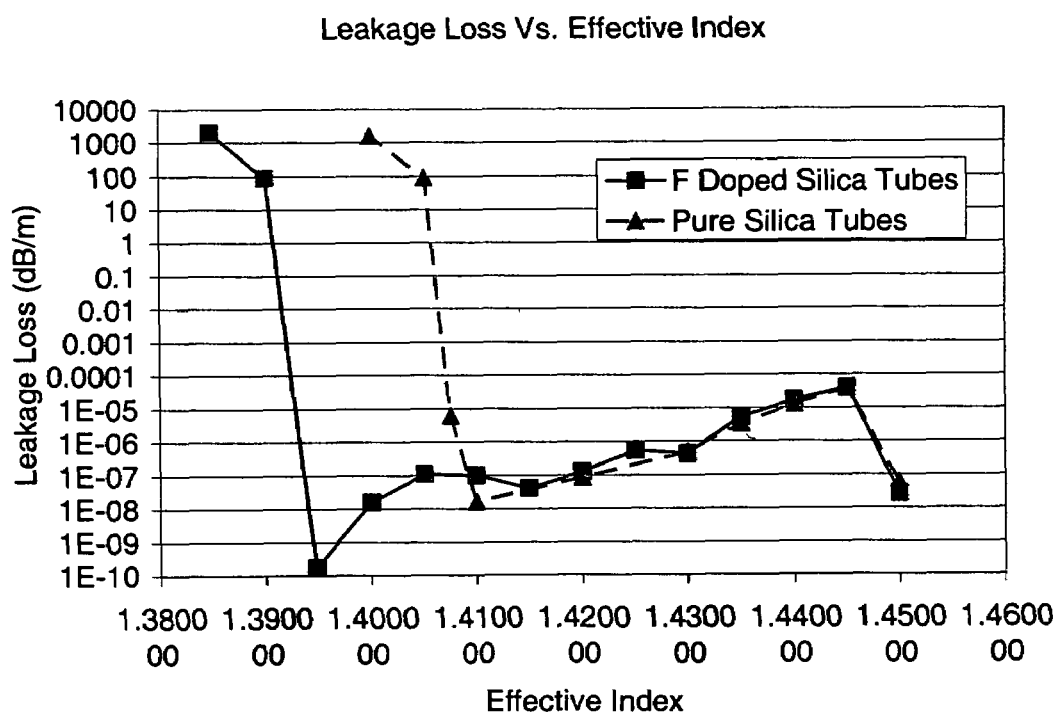
FIG. 5B illustrates the difference between the light leakage loss of the optical fiber according to an embodiment of the present invention that has pure silica tubes and the optical fiber according to another embodiment of the present invention that has thin silica based tubes that are downed doped with fluorine.

FIG. 5B illustrates that when silica tubes were replaced with the 2.2 wt % F doped silica tubes, which results in relative index change of −1%. In this embodiment the inner cladding diameter is 100 μm, the tube outer diameter is 10 μm and the tube wall thickness is 1 μm. The optical fiber 10 according to this embodiment of the present invention has less than 1E-7 dB/m loss due to light leakage between the inner and outer cladding, when the effective index of refraction for the propagating light modes is about 1.405. Furthermore, this optical fiber has less than 1 dB/m loss when the effective indices of refraction of the light modes are about 1.39 and higher, allowing the fiber to function losslessly over an even larger effective index rang than that of the previous embodiment. It is noted that the lower is the effective index, the more higher order modes can propagate through the inner cladding, and the higher is the ENA of the inner cladding (i.e., it approaches 1.) Therefore, since the effective cut-off index of refraction of the inner cladding of this exemplary optical fiber is about 1.39 (which is also the equivalent index of refraction of the gap 15), this fiber can propagate more modes through the inner cladding, thus handling more pump light intensity, and advantageously coupling more light into the rare-earth doped core 12. Thus, when the tunneling loss of this fiber is taken into account, the effective numerical aperture ENA of the inner cladding of the optical fiber associated with this exemplary optical fiber 10 (again, assuming that the inner clad is a pure silica inner clad) is $ENA = (n_{iner\ clad}^2 - n_{equivalent}^2)^{1/2} = (1.45^2 - 1.395^2)^{1/2} = 0.395$.

It is noted that if the inner cladding has a higher index of refraction than that of pure silica, the ENA will be higher. The higher amount of down-dopants in the tube walls will also increase the ENA of the inner cladding. For example, if the inner cladding is doped with 43.7% GeO2, the index of refraction of the inner cladding is 1.48, and the effective numerical aperture is $ENA = (1.48^2 - 1.395^2)^{1/2} = 0.494$ This is an indication that a very small amount of light will be leaked out through the hollow support structure of fiber 10 into the outer cladding.

Figure 6:
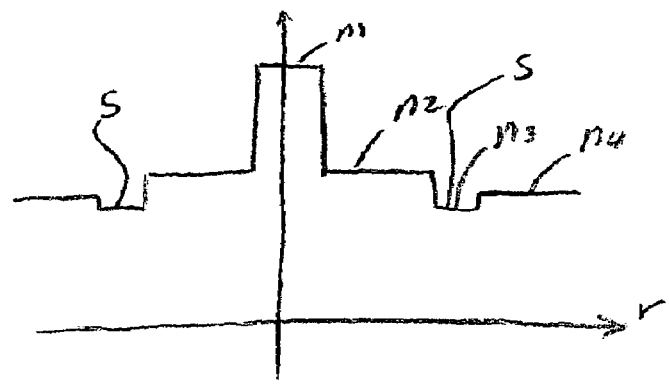
FIG. 6 is a schematic cross-sectional view of a third embodiment of the present invention
Figure 6:
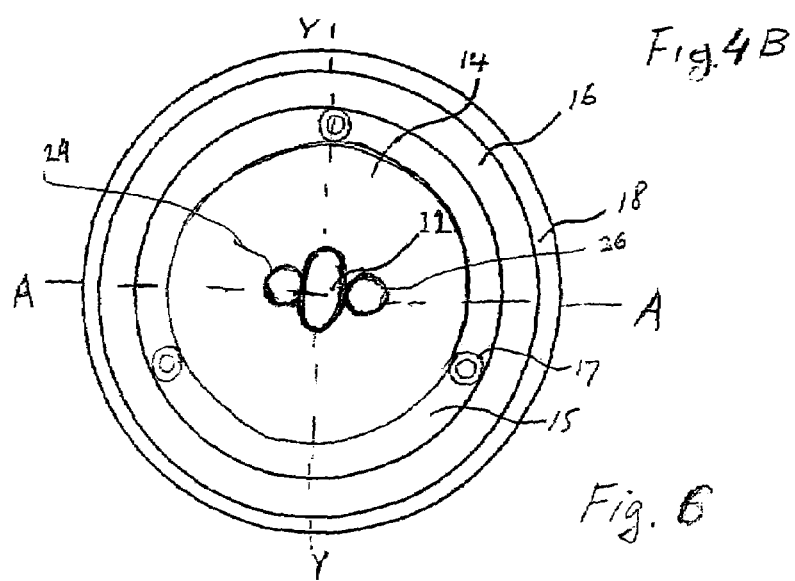

FIG. 6 illustrates an exemplary optical fiber 10 with non-circular core 12. This fiber is a single polarization (SP) fiber. The inner cladding 14 of optical fiber 10 of FIG. 6 contains at least two air holes 24, 26, preferably situated on diametrically opposite sides of the core 12 and extending along the elongated core 12, through the length of the fiber 10. The air holes 24, 26 lower the effective refractive index of the inner cladding 14 along the line A-A and enhance or enable single polarization property of this fiber. The size of the air holes 24, 26 may vary, preferably from 7 to 20 μm in diameter, depending on the desired size (minor axis) of the fiber core.

In the FIG. 1B embodiment the silica based core 12 is doped with Yb, but other rare earth materials, such as Er may also be utilized. The core 12 may also include at least one index raising dopant. The outer cladding further 16 preferably includes an index lowering dopant, such that $n_2 > n_3$ The inner cladding diameter $D_{IN}$ is preferably at least 125 μm and more preferably at least 200 μm. It is even more preferable that inner cladding diameter $D_{IN}$ is at least 225 μm and most preferable at least 250 μm. Applicants discovered that the thick inner cladding 14, a gap or space 15 between the inner cladding 14 and the outer cladding 16 and all-glass construction (i.e., no plastic) of the optical fiber work in synergy to allow the optical fiber to be coupled to high energy source, and to couple the high power into the core without damaging the optical fiber. The size of the gap or space 15 (i.e., the distance between the outer radius $R_{IN}$ of the inner cladding 14 and the inner radius r of the outer cladding 16) is preferably 1 µm-12 µm, more preferably 3 µm-5 µm. This space ensures that the inner cladding 14 has a high NA of about 1, provides heat insulation, and (absent solid support structures shown in FIG. 4A) prevents leakage of pump light from the inner cladding 14 into the outer cladding 16.

Figure 7:
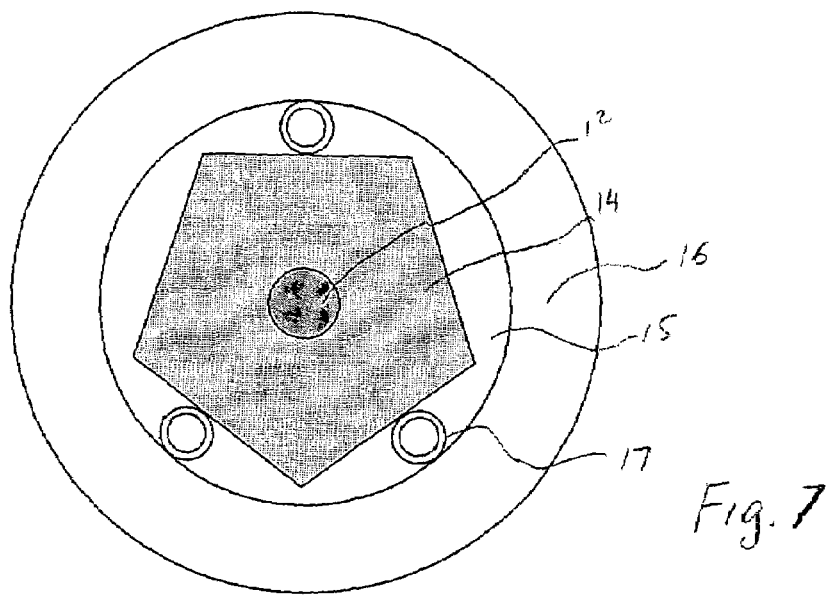
FIG. 7 is a schematic cross-sectional view of a fourth embodiment of the present invention.

It is preferable that the outer cladding 16 be relatively thin, with wall thickness less than 80 µm and preferably between about 5 µm and 35 µm. It is most preferable that the wall thickness of the outer cladding 16 be between about 10 µm to 25 µm. It is preferable that the diameter $D_c$ of the fiber core 12 be about 5 µm to 20 µm, the inner cladding diameter $D_{IN}$ be about 125 µm to 2000 µm and more preferably about 125 µm to 1500 µm. It is even more preferable that $D_{IN}$ be about 125 µm to 350 µm. As stated above, it is preferable that the space 15 has a thickness of about 1 µm to 12 µm. It is preferable that the diameter of the outer cladding diameter ($D_{OUT}$) be about 145 to 2100 µm, more preferably between about 145 µm to 1600 µm and even more preferable that $D_{OUT}$ be about 145 µm to 500 µm. If the inner cladding 14 does not have a circular cross section, Din is defined as the smallest distance from one side of the inner cladding's cross section to the oppositely situated side of the cross section. FIG. 7 illustrates an exemplary optical fiber 10 with non-circular inner cladding shape. It is also noted that the outer cladding 16 may not be circular. If the outer cladding 16 is not circular, $D_{OUT}$ is defined as the smallest distance from one side of the outer cladding's cross section to the oppositely situated side of the outer cladding's cross section. It is preferable that the inner cladding's 14 cross-sectional area be at least 200 times larger than the cross sectional area of the core 12. It is even more preferable that the cross sectional area of the inner cladding 14 be between 300 and 3000 times larger than the cross sectional area of the core 12. For example, the cross sectional area of the inner cladding 16 may be 500, 700, 1000, 1200, 1500, 1600, 2000 or 2500 times larger than the cross sectional area of the core 12.

According to this embodiment, the fiber core 12 includes, in weight percent:

| Rare earth | 0.1 to 2.5 wt %; |
|---|---|
| P | 0 to 5 wt %; |
| Al | 0.5 to 15 wt %; |
| Ge | 0.1 to 15 wt %; |
| F | 0 to 1 wt %. |

The rare earth dopants in the fiber core 12 provide active ions to enable either a gain or a lasing action. Exemplary rare earth dopants are Yb, Er, Nd, Tm, Sm and Tb. It is preferable that the amount of rare earth dopant in the core 12 be 0.5 wt % to 1.5 wt %. Phosphorus may be added to the core materials in order to lower the softening temperature of the core glass, which may be advantageous if the core is produced by the inside vapor deposition process. Phosphorus may also be utilized as a refractive index raising agent. However too much phosphorus (10% or more) provides nonlinearity through Stimulated Raman Scattering which may inhibit the lasing action. Aluminum may be added to the core as a de-clustering agent (for example, to de-cluster Yb, preferably at the ratio of Al to Yb of 5:1 to 10:1). The core 12 may also include germanium which is an index raising dopant, and/or fluorine which is an index lowering dopant as well as a de-clustering agent.

The preferred ranges of the core 12 composition in weight percent are:

| Rare earth | 0.3 to 1 wt %; |
|---|---|
| P | 0 to 2 wt %; |
| Al | 2 to 8 wt %; |
| Ge | 3 to 15 wt %; and |
| F | 0.1 to 0.5 wt %. |

The Yb-doped core 12 will laze at a wavelength range of 1.03-1.11 microns.

It is preferable that the inner cladding 14 contain 5 wt % to 30 wt % Ge in order to provide high NA inner cladding (i.e., as close to 1 as possible). It is even more preferable that the inner cladding 14 comprise 5 wt % to 20 wt % Ge. It is noted that 5 wt % to 10 wt % Ge works well for many applications.

It is preferable that the index lowering dopant of the outer cladding 16 and of the support structure 17 comprises Fluorine and/or Boron in weight percent:

| F | 0.5 to 5 wt %; |
|---|---|
| B | 0.5 to 20 wt %. |

It is preferable that the outer cladding 16 and the support structure 17 (i.e., tube walls) contain at least one of B or/and F. It is preferable that the amount of B is at least 3 wt %. It is preferable to have more than 1 wt % and more preferably more than 2 wt % of F along with more than 8 wt % of B in the outer cladding 16. It is preferable that the outer cladding 16 support structure 17 have less than 5 wt % of F, and less than 15 wt % of B. It is even more preferable that the amount of B and F be: 2 to 4 wt % of F and 3 to 15 wt % of B. Preferably, the glass material of support structure 17 has a lower refractive index than that of the outer cladding 16 so as to prevent residual pump power from entering into the outer cladding 16 via the walls of the support structure 17.

Figure 8A:
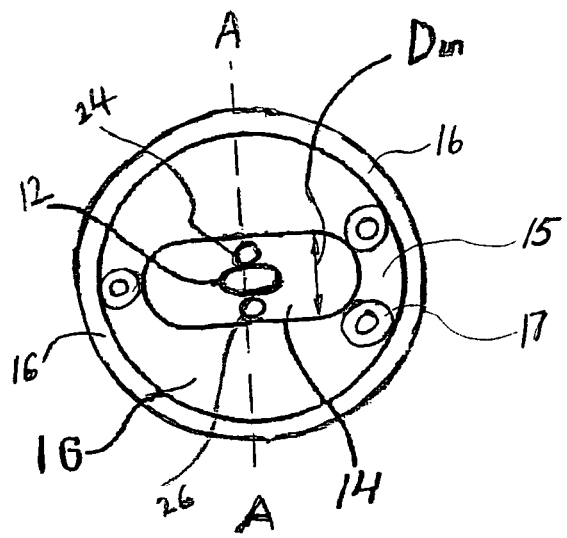
FIGS. 8A-8C are schematic cross-sectional views of other embodiments of the present invention.
Figures 8B, 8C:
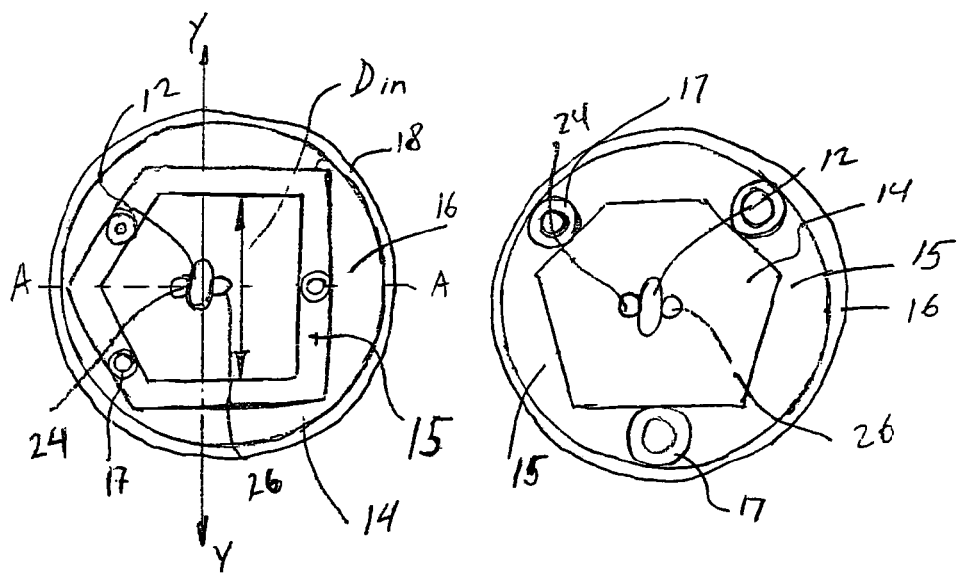

Other embodiments of the double clad optical fiber of the present invention are shown schematically in FIGS. 8A-8C and are generally described and depicted herein with reference to several exemplary or representative embodiments with the same numbers referenced to the same or functionally similar parts. The inner cladding 14 of the optical fiber of FIGS. 7 and 8A-8C is non-circular. The advantage of non-circular inner cladding 14 is that non-circular shape improves the absorption of optical pump power into the core 12. The core 12, for example an elongated core may be located either at the geometric center of the inner cladding, or may be displaced from the geometric center of the inner cladding 14. The outer cladding 16 may be circular, or non-circular.

The cross-section of the first multi-mode inner cladding ($D_{IN}$ is the shorter dimension of the inner cladding as seen in FIGS. 8A-8C) may be designed to have a desired shape, e.g., matched to the near field shape of the pump source or have any other which increases coupling efficiency of the (pump) light from the light source to the inner cladding. Because of the adjacent gap or space 15, the numerical aperture of the inner cladding 14 is high enough to capture the output of the light source, such as the laser diode.

The optical fiber core 12 is preferably circular or elliptical, as shown in FIGS. 1, 6, 7 and 8A-8C, but may have other elongated shapes. According to some of the embodiments of the present invention (FIGS. 6 and 8A-8C), adjacent to the core and situated at least partially within the inner cladding 14 are at least two air holes 24, 26. The elongated (elliptical) core 12, in conjunctions with the air holes 24, 26 renders this optical fiber a single polarization (SP) fiber. It is preferred that the aspect ratio (ratio of major to minor axis) of the elliptical core 12 be at least 1.5:1 and more preferably be between 2:1 and 10:1, because these aspect ratios improve birefringence of the core 12.

The core delta (relative to that of the pure silica) is less than 1% Δ and preferably less than 0.5% Δ. The numerical aperture NA of the core 12 is between 0.05 (for high power laser application) and 0.25 (for lower power application). The numerical aperture NA of the core 12 is defined as $(n_1^2-n_2^2)^{1/2}$, where $n_1$ is the index of refraction of the core 12 and $n_2$ is the index of refraction of the inner cladding 14.

The silica based inner cladding 14 may have a circular outer perimeter, as shown in FIGS. 1 and 5 (with either a central core or an off-center situated core), or a non-circular outer perimeter as shown in FIGS. 7 and 8A-8C. The numerical aperture NA of the inner cladding 14 is defined as $(n_2^2-n_3^2)^{1/2}$, where $n_3$ is the index of refraction of the space 15. Thus, the inner cladding 14 has numerical aperture NA of about 1.

Figure 9A:
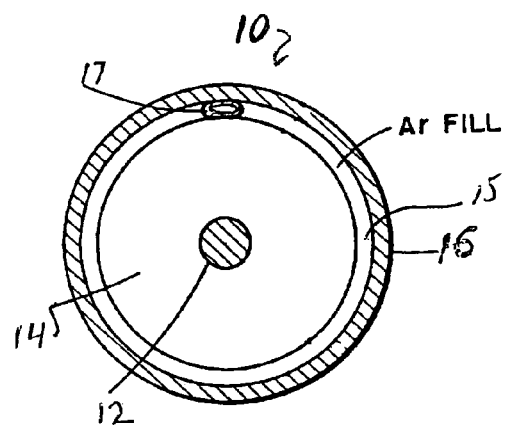
FIG. 9A is a schematic cross-sectional view of yet another embodiment of the present invention.
Figure 9B:
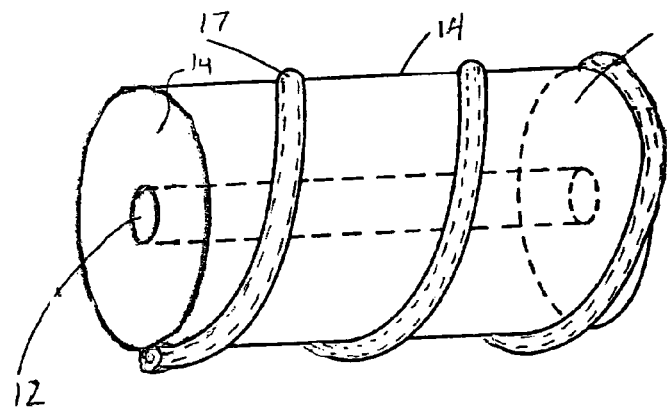
FIG. 9B is a perspective view of the core, inner cladding and the support structure of the optical fiber of FIG. 9A.

Another embodiment of the optical fiber according to the present invention is shown in FIG. 9A. The core and the inner cladding of this fiber is similar to that of the fibers of FIGS. 1, 6, 7 and 8A-8C, but a different support structure 17 is utilized to support the inner cladding 14 within the gap 15. More specifically, a hollow glass tube 17" is wound around the inner cladding 14 and is sintered to both the inner cladding 14 and the outer cladding 16. The tube 17" has thin walls and is either gas (or air) filled, or may include vacuum. The tube 17" helically wraps around the fiber inner cladding 14 at a predetermined pitch (FIG. 9B). Thus the inner cladding 14 is surrounded by a gas or air, except for the area in contact with the tube 17", and the resulting numerical aperture NA of the inner cladding is 1. This fiber can be made in a manner disclosed in U.S. Pat. No., 6,115,526, except that the solid glass rod is replaced by a hollow glass tube.

Recent progress in semiconductor laser technology has led to the creation of light sources utilizing discrete or arrayed broad-area laser diodes coupled to the intermediate fiber incorporated within the light source. The output power of this light source is more than 150 Watt at 976 nm at the output end of the intermediate fiber. The diameter of the intermediate fiber and NA of light source is 200 µm and 0.22 NA, respectively. The light from this light source is then coupled to a double clad optical fiber via high NA and large aperture lenses. With this approach one can obtain essentially 100% of coupling efficiency.

EXAMPLES

The invention will be further clarified by the following examples.

FIGS. 10A and 10B illustrate schematically a relative refractive index profile of a the optical fiber 10 of FIG. 5. More specifically, FIGS. 10A and 10B depicts optical fiber's refractive index percent delta (relative to that of the pure silica) vs. the distance measured from the core center. FIG. 10A illustrates schematically a refractive index profile taken across the region that does not contain the air holes 24, 26, for example, along the line Y-Y of the fiber depicted in FIG. 5. FIG. 10B illustrates schematically a refractive index profile of the same fiber, but taken across the region that contains the air hole 24 (for example, along the line A-A).

FIG. 11 illustrates schematically the refractive index profile (percent delta, relative to that of the pure silica) of an exemplary optical fiber of the present invention along the Y-Y axis, measured from the core center. This optical fiber has the cross-section illustrated in FIG. 8B. The distance $D_{IN}$ between two opposing flat sides of this inner cladding cross section is about 230 µm. The refractive index percent delta is defined herein as $(n_i^2-n_s^2)/2n_i^2$, where i=1, 2 or 3 and $n_s$ is the refractive index of pure silica. This optical fiber has a Yb doped core 12, a Ge-silica inner cladding (% delta ≈0.46) and an outer cladding 16 which doped with Fluorine and Boron.

FIG. 11 shows that the relative refractive index difference (percent delta) of the core 12 is about 0.56, that the fluorine/boron doped outer cladding 16 has the refractive index percent delta of about −1.4. The Yb-doped fiber core is single-mode for the wavelengths above 1 µm. If the core 12 is doped with Erbium, the optical fiber will be single-mode at lasing wavelength of 1.55 µm. The optical fiber 10 has a relatively low NA (about 0.065) for the core 12, and a very high NA for the inner cladding 14. (The NA is defined by $(n_i^2-n_{i+1}^2)^{1/2}$.) This inner cladding NA is that is higher than that of the pump-source, allowing high coupling efficiency for the pump light of abut 100%. The small core NA (0.065) enables single mode operation with a large core size (10.5 microns diameter). If the core NA is higher (0.13, for example), the core diameter would have to be smaller (about 5 microns, for example) in order to be single mode. The bigger core diameter and lower core NA allows the core 12 to stay single-mode, while allowing the core to take more pump-power from the inner cladding, and also increases fiber power handling capability. The specific composition for this exemplary optical fiber is:

Core 12: 0.6 wt % $Yb_2O_3$; 4.5 wt % $AL_2O_3$; 3.0 wt % $GeO_2$; 0.2 wt % F;

Inner cladding 14: 8.5 wt % $GeO_2$;

Outer cladding 16: 9 wt % B and 2.7 wt % F.

The amount of each dopant is optimized to ensure the high laser efficiency. The preferred inner cladding shape is not circularly symmetric, thus maximizing the pump absorption. This fiber is a single polarization fiber and has a single polarization bandwidth (SPB) that is around 20 nm. The SPB is centered at 1080 nm in which lasing taking place. In this exemplary fiber the first cutoff wavelength $\lambda_1$ is about 1070 nm and the second cutoff wavelength λ2 is about 1090 nm.

It will be apparent to those skilled in the art that variations and modifications can be made to the present invention without departing from the scope of the invention. For example, although step index structures are show, other graded index structures may be employed. Moreover a ring structure may be added to the fiber profile as well and would still function acceptably. Thus, it is intended that the present invention cover the modifications and variations of this invention provided they come within the scope of the appended claims and their equivalents.

What is a claimed is:

1. An optical fiber, comprising:
    a rare earth doped core with a first refractive index ($n_1$);
    a silica based inner cladding abutting and at least substantially surrounding said core of said fiber, said inner cladding having a refractive index $n_2$, wherein $n_2<n_1$;
    a silica based outer cladding surrounding said inner cladding, the outer cladding having a fourth refractive index ($n_4$), said outer cladding and said inner cladding defining a space having the refractive index $n_3$ of about 1, so $n_3<n_2$ and $n_3<n_4$ and said space substantially encloses said inner cladding; and
    at least one support structure situated between said outer cladding and said inner cladding of said fiber, wherein said support structure of said fiber is either hollow or gas filed and is not connected to any other support structure of said fiber.

2. The optical fiber according to claim 1, said support structure has a wall thickness of less than 3 μm.

3. The optical fiber according to claim 1, said support structure has a wall thickness of less than 2 μm.

4. The optical fiber according to claim 1, wherein said space is a gas-filled space.

5. An optical fiber, comprising:
a rare earth doped core with a first refractive index ($n_1$);
a silica based inner cladding abutting and at least substantially surrounding said core, said inner cladding having a refractive index $n_2$, wherein $n_2<n_1$;
a silica based outer cladding surrounding said inner cladding, the outer cladding having a fourth refractive index ($n_4$), said outer cladding and said inner cladding defining a space having the refractive index $n_3$ of about 1, so $n_3<n_2$ and $n_3<n_4$ and said space substantially encloses said inner cladding; and
at least one support structure situated between said outer cladding and said inner cladding, wherein said support structure is either hollow or gas filed and is not connected to any other support structure, wherein the optical fiber exhibits single polarization at the operating wavelength band.

6. The optical fiber according to claim 1, wherein said support structure is a silica based tube.

7. The optical fiber according to claim 6 wherein the silica tube material is silica down-doped with at least one dopant selected from the group consisting essentially of: boron and fluorine.

8. The optical fiber according to claim 1 wherein said inner cladding has a non-circular shape.

9. An optical fiber, comprising:
a rare earth doped core with a first refractive index ($n_1$);
a silica based inner cladding abutting and at least substantially surrounding said core, said inner cladding having a refractive index $n_2$, wherein $n_2<n_1$;
a silica based outer cladding surrounding said inner cladding, the outer cladding having a fourth refractive index ($n_4$), said outer cladding and said inner cladding defining a space having the refractive index $n_3$ of about 1, so $n_3<n_2$ and $n_3<n_4$ and said space substantially encloses said inner cladding; and
at least one support structure situated between said outer cladding and said inner cladding, wherein said support structure is either hollow or gas filed and is not connected to any other support structure wherein said fiber exhibits (i) single polarization within a single polarization band with the bandwidth is at least 10 nm and (ii) has inner cladding numerical aperture NA=1.

10. The optical fiber of claim 9 wherein said single polarization band is centered around one of the following wavelengths: 1060 nm, 1310 nm, 1550 nm.

11. The optical fiber of claim 1 wherein the core contains germania-doped silica.

12. The optical fiber of claim 1 further comprising a maximum relative refractive index of the core is less than 0.5%.

13. The optical fiber of claim 1 wherein said core has a short core dimension between 1 to 5 microns and a long core dimension between 1.5 and 15 microns.

14. The optical fiber according to claim 1, further including an air hole inside said core.

15. The optical fiber according to claim 1 further including at least one air hole situated at least substantially inside said inner cladding.

16. An optical fiber according to claim 1, said fiber comprising:
a plurality of support structures situated between said outer cladding and said inner cladding, wherein said support structures are either hollow or gas filed and wherein at least one of said support structures is not connected to other support structures.

17. The optical fiber according to claim 16, wherein said support structures are silica based tubes.

18. An optical fiber, comprising:
a core with a first refractive index ($n_1$);
a silica based outer cladding surrounding said core of said fiber, the outer cladding having a refractive index (n), such that the core is substantially surrounded by a gap situated between the core and the outer cladding, said gap containing at least one support structure adjacent to said outer cladding and situated between said outer cladding and said core, wherein said support structure is (i) either hollow or gas filed and (ii) not in contact, nor connected to any other support structure situated within said gap.

19. An optical fiber, comprising:
a core with a first refractive index ($n_1$);
a silica based outer cladding surrounding said core of said fiber, the outer cladding of said fiber having a refractive index (n), such that the core of said fiber is substantially surrounded by a gap situated between the core and the outer cladding, said gap containing at least one support structure adjacent to said outer cladding and situated between said outer cladding and said core, wherein said support structure is (i) either hollow or gas filed and (ii) not connected to any other support structure situated within said gap;
a silica based inner cladding abutting and at least substantially surrounding said core, said inner cladding having a refractive index $n_2$, wherein $n_2<n_1$;
wherein said a silica based outer cladding is surrounding said inner cladding, said outer cladding and said inner cladding defining a fiber space having the refractive index $n_3$ of about 1, so $n_3<n_2$ and $n_3<n_4$ and said space substantially encloses said inner cladding; and
a plurality of support structures situated between said outer cladding of said fiber and said inner cladding of said fiber, wherein said support structures of said fiber are either hollow or gas filed and wherein at least one of said support structures is not connected to other support structures of said fiber, and at least two of said support structures of said fiber were separated by a distance larger than the width of each of said support structures.

20. An optical fiber according to claim 18, wherein the fiber has less than 0.1 dB/m loss due to light leakage through said gap.

* * * * *